US 6,490,682 B2
Dec. 3, 2002

(12) United States Patent
Vanstone et al.

(54) LOG-ON VERIFICATION PROTOCOL

(75) Inventors: Scott A. Vanstone, Waterloo (CA); Donald Johnson, Fairfax, VA (US)

(73) Assignee: Certicom Corporation, Ontario (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/432,189

(22) Filed: Nov. 2, 1999

(65) Prior Publication Data

US 2001/0056535 A1 Dec. 27, 2001

Related U.S. Application Data

(63) Continuation of application No. PCT/CA98/00417, filed on May 4, 1998.

(30) Foreign Application Priority Data

May 2, 1997 (GB) .............................................. 9709136

(51) Int. Cl.[7] ................................................. H04L 9/00
(52) U.S. Cl. ...................... 713/171; 713/182; 380/277
(58) Field of Search ................................. 380/278, 259; 320/258; 713/168, 169, 170, 171

(56) References Cited

U.S. PATENT DOCUMENTS 5,434,918 A    7/1995   Kung et al.
6,085,320 A *  7/2000   Kalishi, Jr. ................. 713/168
6,151,676 A * 11/2000   Cuccia et al. ............... 380/259

OTHER PUBLICATIONS

Menezes et al, Handbook of Applied Cryptography, Oct. 17, 1996, pp. 172, 188, 397, 398, 404, 405, 494, 497, and 498.*
I'Anson, C. et al.: "Security Defects in CCITT Recommendation X.509—The Directory Authentication Framework" Computer Communication Review, vol. 20, No. 2, Apr. 20, 1990, pp. 30–34, XP 000133725 New York (US).

Miyaji, A.: "Elliptic Curves Over $F_p$ Suitable for Cryptosystems" Advances in Cryptology—AUCRYPT '92 Gold Coast, Queensland, Dec. 13–16, No. Conf. 3, Dec. 13, 1992, pp. 479–491, XP000470467 Berlin (DE).

Pil Joong Lee: "Secure User Access Control for Public Networks" Advances in Cryptology—AUCRYPT '90, Sydney, Jan. 8–11, 1990, No. Conf. 1, Jan. 8, 1990, pp. 46–57, XP000145201 Berlin (DE).

* cited by examiner

Primary Examiner—Matthew B. Smithers
(74) Attorney, Agent, or Firm—Jenkens & Gilchrist, A Professional Corporation

(57) ABSTRACT

A method and apparatus for authenticating a pair of correspondents C, S in an information exchange session to permit exchange of information therebetween. The first correspondent C having log on applets and the correspondent having means for processing applets. The method is characterized in that the first correspondent C transmitting to the second correspondent S a first unique information, the second correspondent S verifying the identity of C and generating a second unique information; transmitting to C the first and second unique information; the C verifying the first unique information to thereby establish currency of the session; the first correspondent C then generating a third unique information and transmitting the third unique information to the S along with an information request; the second correspondent S transmitting to C the requested information along with said second and third unique information; said c verifying said third unique information to thereby establish currency of the request and verifying the second unique information to thereby establish currency of the session; said C repeating steps the above steps for each additional information requested by C.

17 Claims, 3 Drawing Sheets

LOG-ON VERIFICATION PROTOCOL

This is a continuation of PCT/CA98/00417, which was filed on May 4, 1998.

FIELD OF THE INVENTION

The invention relates to a protocol for the secure receipt and transmission of data between a pair of correspondents and in particular for the secure receipt of data by a client in a client-server environment.

BACKGROUND OF THE INVENTION

With the advent of the Internet and the proliferation of Internet users along with the dramatic increase in data baud rates, there has been a move to distributed computing. For example, in the windows environment, a browser may be used to access a website and download a HTML page. Within the page might be included a program applet much like an image that is contained within the page. The applet's code is transferred from the server to the client system and executed by the client's computer. There are also instances where software or program applets are provided from a server to a client.

In the cases where the client does not trust the server a protocol has to be implemented whereby the client is able to authenticate the server. Or more generally where the client does not know the server since the server will serve any client, i.e. any requester is potentially valid as far as the client is concerned. Furthermore the applets received from the server include in some instances a log-on applet received from the server. Thus there exists a need for a log-on applet authentication protocol. The documents titled "Security Defects in CCITT Recommendation X.509-The Directory Authentication Framework", "Elliptic Curves Over $F_p$ Suitable For Cryptosystems", "Secure User Access Control For Public Networks", and U.S. Pat. No. 5,434,918 are referenced as background art.

SUMMARY OF THE INVENTION

This invention seeks to provide a solution to the problem of server verification by a client.

According to an aspect of this invention there is provided a method of authenticating pair of correspondents C,S in an information exchange session to permit exchange of information there between, characterized in that:
  a) the first correspondent C transmitting to the second correspondent S a first unique information,
  b) the second correspondent S verifying the identity of C and generating a second unique information;
  c) transmitting to C the first and second unique information;
  d) the C verifying the first unique information to thereby establish currency of the session;
  e) the first correspondent C then generating a third unique information and transmitting the third unique information to the S along with an information request;
  f) the second correspondent S transmitting to C the requested information along with said second and third unique information;
  g) said c verifying said third unique information to thereby establish currency of the request and verifying the second unique information to thereby establish currency of the session;
  h) said C repeating steps e) to g) for each additional information requested by C.

Also, this aspect of the invention provides for apparatus for carrying out the method. Such an apparatus can comprise any computational apparatus such as a suitably programmed computer.

DESCRIPTION OF THE DRAWINGS

These and other advantages of the present invention will become more apparent from the following discussion of preferred embodiments of the invention which are described by way of example only and with reference to the accompanying drawings in which like elements have been assigned like reference numerals and where.

DESCRIPTION OF EMBODIMENTS OF THE INVENTION

Figure 1:
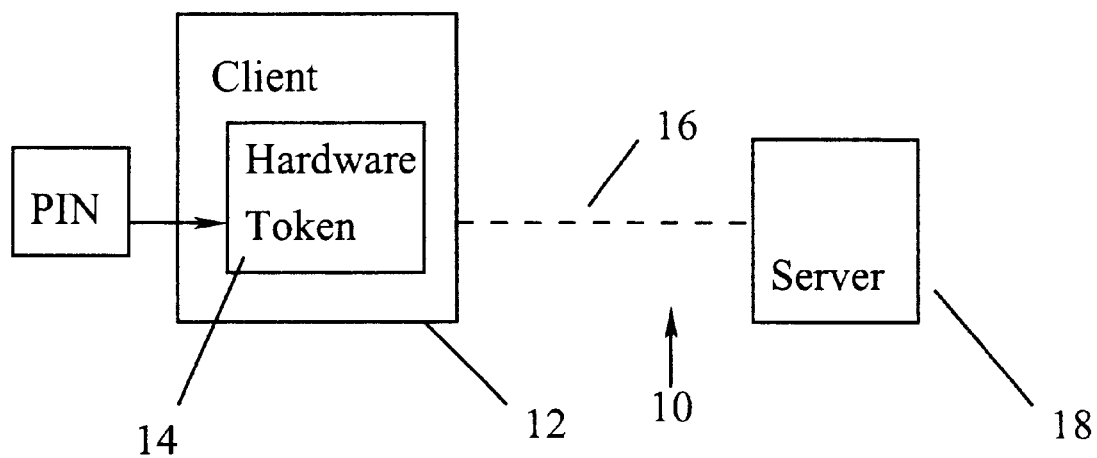
FIG. 1 is a schematic diagram of a client server configuration.

Referring to FIG. 1, a typical arrangement in which the protocol may be implemented is shown generally numeral 10. A client 12 includes a hardware token 14 and connects via a suitable communication channel 16 to a server 18. The hardware token 14 may be PIN activated and includes a root certifying authority (CA) public key, $PU_{CA}$, a client private key, $P_C$, and an ECDSA (elliptic curve digital signature algorithm) signing software. It may be noted that the hardware token may also be mimicked or implemented in software.

In addition to the hardware token, the client has stored therein an identification of the client, $ID_C$, wherein some cases the ID could be the certificate of the client containing the public key $PU_C$ of the client. Alternatively the certificate may contain only the identity $ID_C$ of the client. This identity may then be used as an index into a look-up table of public keys stored in the server. Additionally, the client includes a hash function such as SHA-1, an elliptic curve DSA (ECDSA) verification software, and optionally MQV (Menezes-Qu-Vanstone) key exchange algorithm software and a DES (Data Encryption Standard) or TDES (Triple DES) encryption algorithms which are used to encrypt and/or authenticate applets from the server.

The server includes log-on applets, crypto software and other applets. The server also includes a private key $PR_S$ and a certificate $CERT_S$ which includes its public key $PU_S$. Optionally the server may also include a database of client public keys indexed by a client identification.

Figure 2:
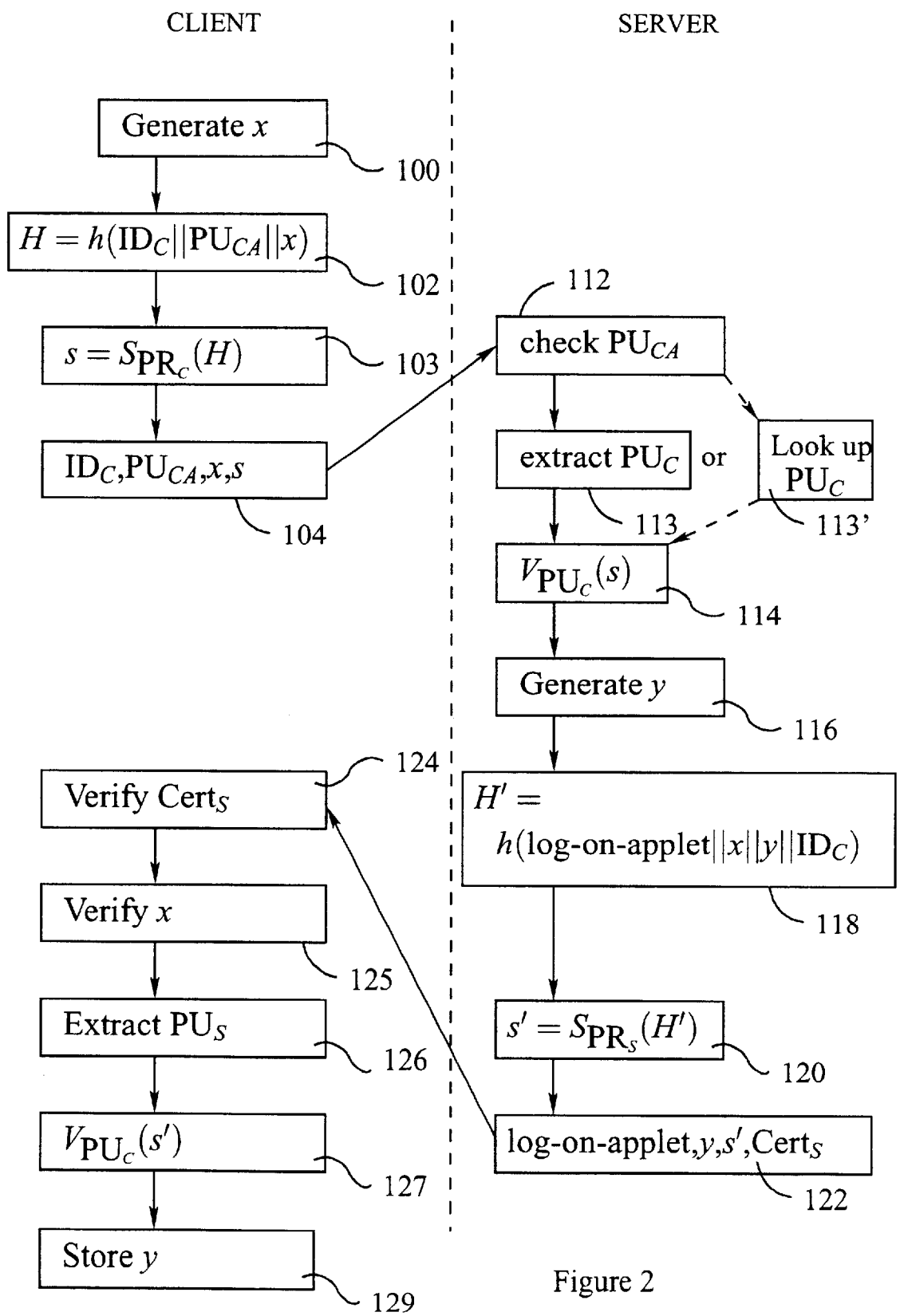
FIG. 2 is a schematic diagram showing server authentication.

Referring now to FIG. 2, when the client 12 wishes to request an applet from a server for the first time, the client first authenticates the server by generating a random number x 100, preferably on the hardware token 14. A counter or a time stamp or the like may generate the value x. A hash H on the concatenation of the client identification $ID_C$, the root public key and x is computed 102. A signature s of the hash H is calculated using the client private key $PR_C$ 103. The client then sends a request 104 containing $ID_C$, $PU_{CA}$, x, s to the server 18. The client to indicate the currency of the transaction of session uses the value x.

The server then checks that root certifying authority public key $PU_{CA}$ is correct 112. The client public key $PU_C$ is either extracted 113 from the certificate or a lookup 113' is performed in the server database. The signature s is then verified 114 using $PU_C$.

The server then generates a random number y 116 and computes the hash H' 118 on the concatenated message of the log of the applet, x, y and $ID_C$. A signature s' on the hash H' is computed using the server private key $PR_S$ 120. A response 122 is sent to the client and includes the log-on applet, y, s' and the server's certificate $CERT_S$. Once the client receives this information it verifies the validity of $CERT_S$ 124. The client also verifies x 125, which was sent back with the message from the server and thus indicating the currency of the session. The public key of the server $PU_S$ is extracted from the certificate 126 and used to verify the signature s' 127. This then verifies the server to the client. The value y is also extracted saved by the client 129 to be used in later transactions.

Figure 3:
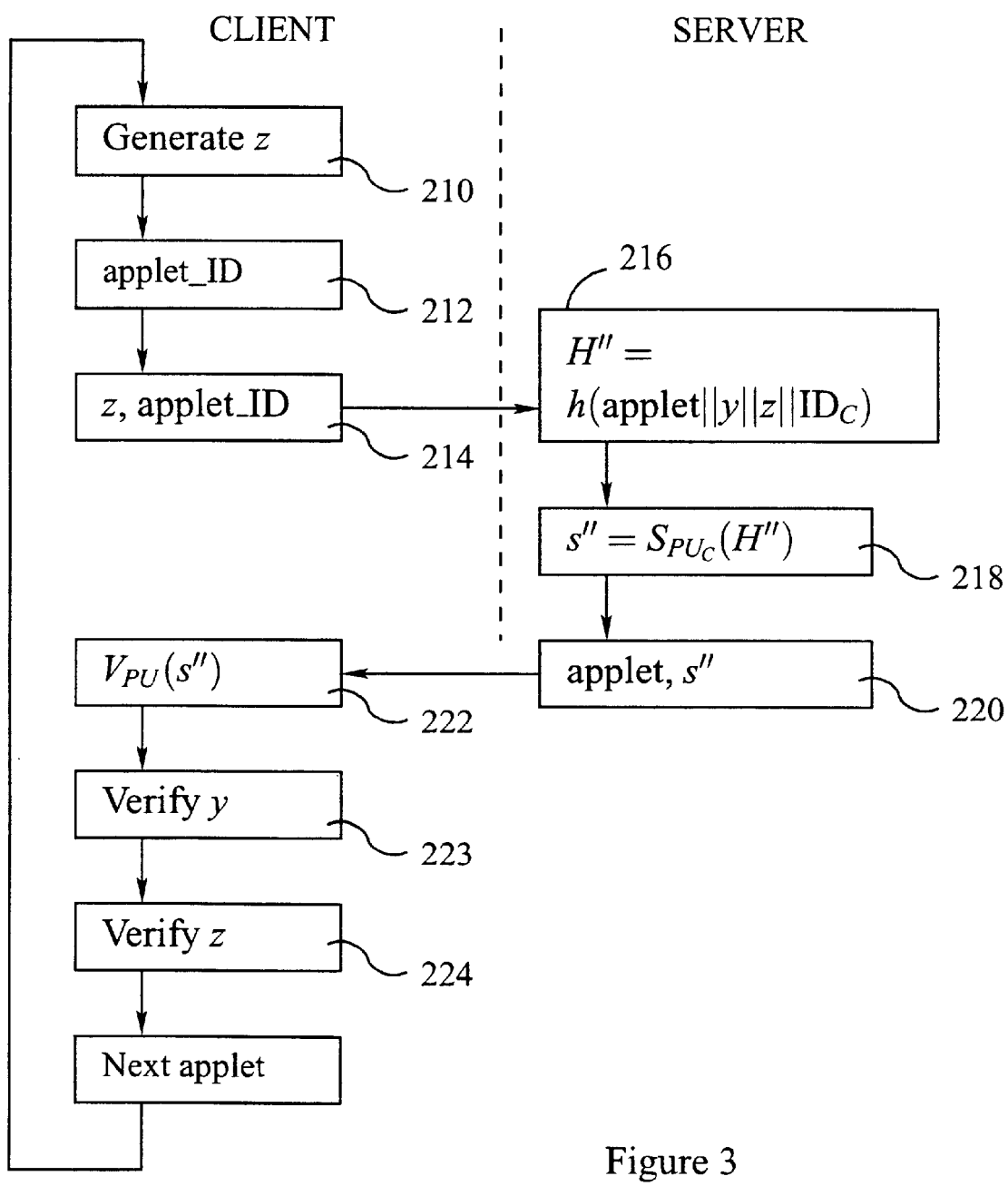
FIG. 3 is a schematic diagram showing applet authentication.

Turning to FIG. 3, once the client has verified the server it may then request an appropriate applet by first generating a random number z 210. A request 214 is then sent to the server which includes an identification of the appropriate applet 212 and the random number z. The server then computes a hash H" on the concatenation of the applet, y, z and $DC_C$ 126. The server then computes a signature s" 218 on the hash H" using the private key of the server $PR_C$. Both the applet and the signature s" are then sent to the client 220. The client verifies the signature 222 using the server public key and once verified may safely use the applet. The value y is also verified 223 to establish currency of the sessio. The value Z is also checked 224 to make sure it is current. If the client requires more applets, steps 210 and 224 are repeated for a given session. When a new session is resumed the client may re-authenticate the server as set out in FIG. 2.

While the invention has been described in connection with a specific embodiment thereof and in a specific use, various modifications thereof will occur to those skilled in the art without departing from the essence of the invention.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the invention.

What is claimed is:

1. A method of authenticating an exchange of information between a pair of correspondents (C, S) in a public key information exchange session where each of said correspondents have a respective public key pair with a private key and a corresponding public key, to permit exchange of information therebetween, said method including:
   a) the first correspondent (C) transmitting to the second correspondent (S) a first message including a first unique information and a first authentication utilising said private key
   b) the second correspondent (S) utilising said first authentication to verify the identity of the first correspondent (C) and generating a second unique information;
   c) transmitting from said second correspondent (S) to the first correspondent (C) a second message including the first and second unique information together with a second authentication utilising said private key of said second correspondent to bind said first and second unique information to said correspondent (S);
   d) the first correspondent (C) utilising said second authentication to verify the first unique information to thereby establish the identity of said second correspondent (S) and currency of the session;
   e) the first correspondent (C) then initiating the exchange of information by generating a third unique information and transmitting the third unique information to the second correspondent (S) along with an information request;
   f) the second correspondent (S) transmitting to the first correspondent (C) the requested information along with said second and third unique information and a further authentication utilising said private key of said second correspondent to bind said second and third unique information to said second correspondent (S);
   g) said first correspondent (C) utilising said further authentication to verify to verify said third unique information to thereby establish currency of the request and verifying the second unique information to thereby establish currency of the session.

2. A method as defined in claim 1, said first unique information being a random number x.

3. A method as defined in claim 2, said first correspondent (C) including a hardware token for generating said first random number.

4. A data communication system for providing exchange of authenticated information between a pair of correspondents (C, S) in a public key information exchange session, said system comprising
   a) said first correspondent (C) including a hardware token having a public key pair with a public key, and a private key and a public key signature algorithm,
   b) a second correspondent (S) having a public key pair with a respective private key and a corresponding public key and a public key signature algorithm, and
   c) a computer program to control exchange of information between said correspondents; said program conditioning said first and second correspondents for
      i) transmitting to the second correspondent (S) a first message including a first unique information and a first authentication utilising said private key of said first correspondent (C) to bind the first unique information to said correspondent (C),
      ii) causing said second correspondent (S) to utilise said first authentication to verify the identity of the first correspondent (C) and generate a second unique information;
      iii) transmitting from said second correspondent (S) to the first correspondent (C) a second message including the first and second unique information together with a second authentication utilising said private key of said second correspondent to bind said first and second unique information to said second correspondent (S);
      iv) the first correspondent (C) utilising said second authentication to verify the first unique information to thereby establish the identity of said second correspondent (S) and currency of the session;
      v) the first correspondent (C) then initiating the exchange of information by generating a third unique information and transmitting the third unique information to the second correspondent (S) along with an information request;
      vi) the second correspondent (S) transmitting to the first correspondent (C) the requested information along with said second and third unique information and a further authentication utilising said private key of said second correspondent to bind said second and third unique information to said second correspondents (S);
      vii) said first correspondent (C) utilising said further authentication to verify said third unique information to thereby establish currency of the request and to verify the second unique information to thereby establish currency of the session.

5. A system for authenticating a pair of correspondents (C, S) in an information exchange session, to permit exchange of information therebetween, the system comprising:

a) means for transmitting by the first correspondent (C) to the second correspondent (S) a first message including a first unique information and a first authentication utilising said private key of said first correspondent to bind the first unique information to said correspondent (C), b) means for verifying the identity of the first correspondent(C) by the second correspondent (S) utilising said first authentication and for generating a second unique information;

c) means for transmitting to the first correspondent (C) the first and second unique information together with a second authentication utilising said private key of said second correspondent to bind said first and second unique information to said second correspondent (S);

d) means for verifying the first unique information by the first correspondent (C) utilising said second authentication to thereby verify the identity of said second correspondent (S) and establish currency of the session;

e) means for initiating the exchange of information by generating a third unique information and transmitting the third unique information to the second correspondent (S) along with an information request;

f) means for transmitting to the first correspondent (C) the requested information along with said second and third unique information and a further authentication utilising said private key of said second correspondent (S) to bind said second correspondent (S) to said second and third unique information;

g) means for said first correspondent (C) utilising said further authentication to verify said third unique information to thereby establish currency of the request and to verify the second unique information to thereby establish currency of the session.

6. A method according to claim 1 wherein said first correspondent (C) repeats step e) to g) of claim 1 utilizing said second unique information for each additional information requested by said first correspondent (C).

7. A method according to claim 6 wherein for each additional information requested a different value of said third unique information is generated.

8. A method according to claim 1 wherein second message and said second authentication includes information additional to said first and second unique information to be utilized by said first correspondent (C) in continuing communication with said second correspondent (S).

9. A method according to claim 1 wherein said further authentication includes the information requested by said first correspondent (C).

10. A method according to claim 1 wherein said authentications are digital signatures performed using a private component of the public keys of pair respective ones of said correspondents.

11. A method according to claim 10 where said signatures are performed utilizing an ECDSA signature protocol.

12. A system according to claim 4 wherein said program conditions first correspondent (C) to repeat steps e) to g) of claim 4 utilizing said second unique information for each additional information requested by said first correspondent (C).

13. A system according to claim 12 wherein for each additional information requested a different value of said third unique information is generated.

14. A system according to claim 4 wherein said second message and said second authentication includes information additional to said first and second unique information to be utilized by said first correspondent (C) in continuing communication with said second correspondent (S).

15. A system according to claim 4 wherein said further authentication includes the information requested by said first correspondent (C).

16. A system according to claim 4 wherein said authentications are digital signatures performed using a private component of the public key of pair respective ones of said correspondents.

17. A method according to claim 16 wherein said signatures are performed utilizing an ECDSA signature protocol.

* * * * *

UNITED STATES PATENT AND TRADEMARK OFFICE
CERTIFICATE OF CORRECTION

Page 1 of 1

PATENT NO. : 6,490,682 B2
APPLICATION NO. : 09/432189
DATED : December 3, 2002
INVENTOR(S) : Scott A. Vanstone and Donald Johnson It is certified that error appears in the above-identified patent and that said Letters Patent is hereby corrected as shown below:

On the Title page, item (73), "Assignee: Certicom Corporation, Ontario (CA)" should read as --Assignee: Certicom Corp., Mississauga (CA)--

Signed and Sealed this
Twenty-ninth Day of October, 2013

Teresa Stanek Rea
*Deputy Director of the United States Patent and Trademark Office*